(No Model.) 2 Sheets—Sheet 1.

J. I. & C. F. NISSEN.
VEHICLE RUNNING GEAR.

No. 293,907. Patented Feb. 19, 1884.

Attest;
T. Walter Fowler
H. B. Applewhaite

Inventor;
John J. Nissen
Christian F. Nissen
per atty
A. H. Evans & Co.

N. PETERS, Photo-Lithographer, Washington, D. C.

(No Model.) 2 Sheets—Sheet 2.
J. I. & C. F. NISSEN.
VEHICLE RUNNING GEAR.
No. 293,907. Patented Feb. 19, 1884.
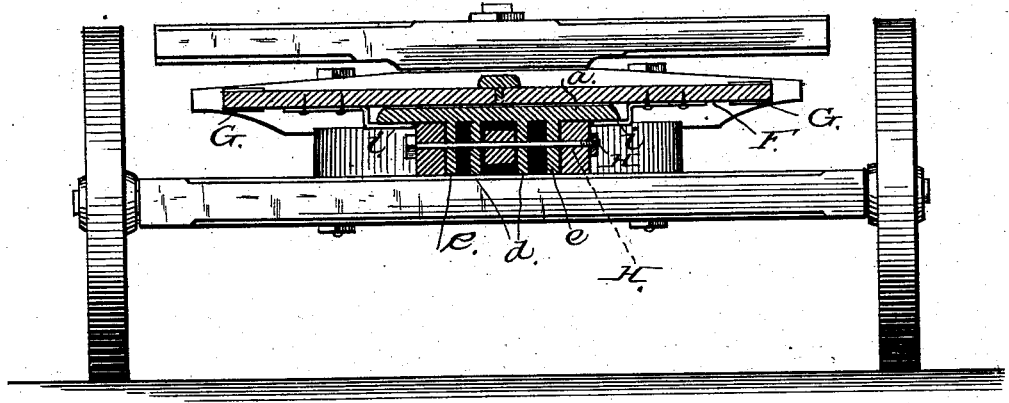
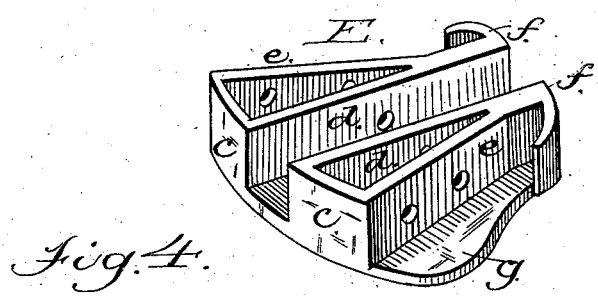
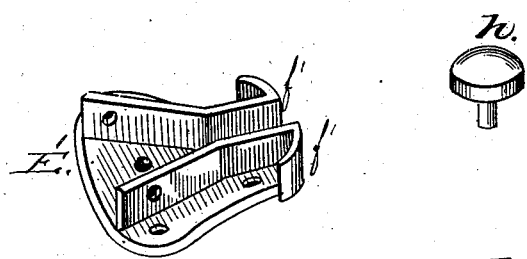 
Attest:
F. Walter Fowler,
H. B. Applewhaite,
Inventor:
John J. Nissen
Christian F. Nissen
per Atty.
A. H. Evans & Co.

UNITED STATES PATENT OFFICE.

JOHN I. NISSEN AND CHRISTIAN F. NISSEN, OF SALEM, NORTH CAROLINA; SAID C. F. NISSEN ASSIGNOR TO C. F. NISSEN & CO., OF SAME PLACE.

VEHICLE RUNNING-GEAR.

SPECIFICATION forming part of Letters Patent No. 293,907, dated February 19, 1884.

Application filed October 19, 1883. (No model.)

*To all whom it may concern:*

Be it known that we, JOHN I. NISSEN and CHRISTIAN F. NISSEN, citizens of the United States, residing at Salem, in the county of Forsyth, State of North Carolina, have invented certain new and useful Improvements in Vehicle Running-Gear, of which the following is a full, clear, and exact description, reference being had to the accompanying drawings, making part of this specification, in which—

Figure 1:
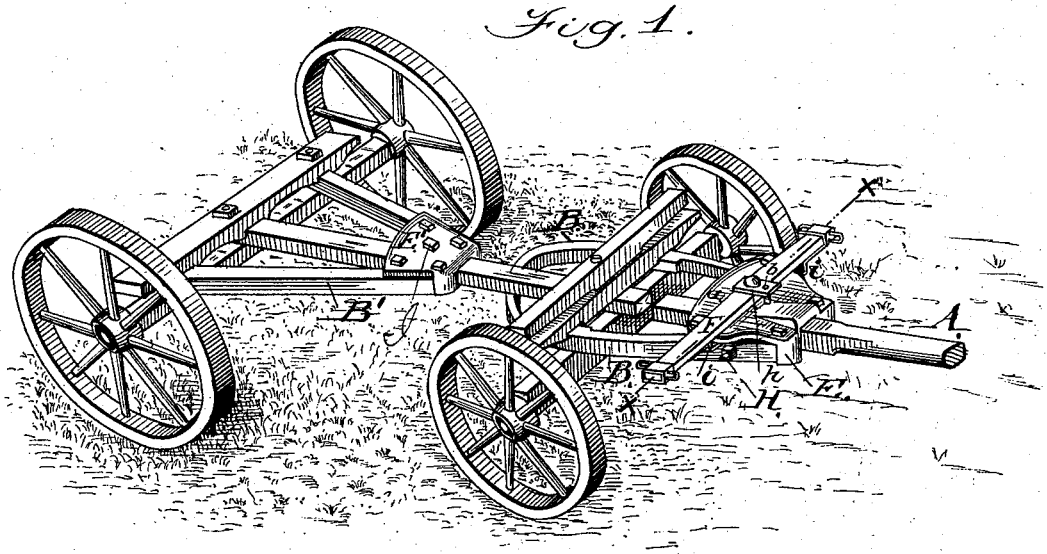
Figure 2:
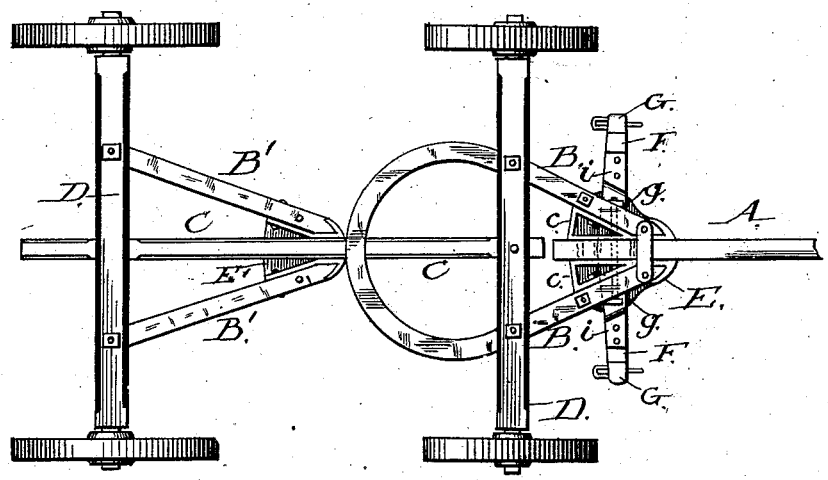

Figure 1 is a perspective view of the running-gear of a vehicle with our improvements attached. Fig. 2 is a bottom view. Fig. 3 is a transverse section through $x\ x$ of Fig. 1. Fig. 4 is a detail to be referred to.

Our invention relates more particularly to improvements in fastenings for the hounds and tongues of vehicles; and it consists in the combination of devices hereinafter explained and claimed.

In the drawings, A represents the tongue, B B' the hounds, C the coupling-pole, and D the axles, of an ordinary vehicle. The cap-piece E, by which the tongue is secured to the hounds B, is formed in the manner and shape shown in Fig. 4, and is constructed with the upper plate, $a$, cast with the lug $b$ on the top of the plate, and having the wings $c\ c$, the inner walls, $d\ d$, of which are parallel, and the outer walls of which, $e\ e$, are flaring, as shown in Fig. 4, and also provided with the lips or projections $f\ f$ and horizontal flanges $g\ g$, for purposes hereinafter explained. The cap E fits over the forward ends of the hounds B, embracing within its inner parallel walls, and forming a passage for the tongue A, while the lips or projections $f\ f$ receive and hold the forward ends of the hounds, which are bolted to the flaring walls of the wings and also to the top plate, thus securing the hounds against possibility of being damaged by any strain which may be brought upon them. The lug $b$ on the upper face of the plate is to receive the thrust of the double-tree F, which is placed immediately behind and against the lug, to which it is attached by the plate $h$, passing over the top of the lug, and provided with a pin entering the top of the double-tree, thereby attaching the double-tree to the lug sufficiently secure to hold it in place, and avoiding any necessity for weakening the double-tree by a central hole, as in the case ordinarily with double-trees when secured in place by a bolt. On the under side of the double-tree are secured the bent plates $i$, fitting beneath the horizontal flanges $g\ g$, whereby the double-tree is held in position on the plate $a$, and is prevented from tipping when subjected to a weight on one end, as in the case of a person stepping thereon to mount into the vehicle. On each end of the double-tree F we secure the clip G, cast preferably from malleable iron in one piece, and so formed as to take in both stay-chains and single-tree, and fit snugly over and outside of the ends of the double-tree, thus securing great additional strength.

It is evident from this description that a double-tree so made and secured to the cap E may be made much lighter than and yet possess equal strength with ordinary double-trees that are perforated and secured by the usual means of a bolt. It is also evident that in such a cap straight hounds may be secured, thus avoiding shaping the hounds across the grain of the wood, as is ordinarily done.

In our present invention, in order to give greater strength to the hounds B, and to keep them as much out of the way as possible in loading logs or timbers of any kind, we have made these hounds of a single piece of straight timber bent in the center, as shown in Fig. 2, the ends being brought together and secured in the cap by lateral and vertical bolts, as above mentioned. The tongue, being placed in position between the inner parallel walls, $d$, of the wings $e$, is secured in position by a transverse bolt, H. The tongue being provided longitudinally with a series of lateral holes for the reception of this bolt, it is evident that the tongue may be easily and quickly adjusted to suit the length of any team, which is a very important feature in our invention.

The cap-piece E', by which the coupling-pole is secured to the hounds B', is in the main similar to the cap-piece E, but is not provided with a lug or flange, as shown in cap E, but is perforated in the center to receive the bolt by which the coupling-pole is fastened in potion.

Having thus fully described our invention, what we desire to claim and secure by Letters Patent is—

1. The cap E, provided with the upper plate, a, lug b, wings c, having the diagonal portion, lips f, and horizontal flange g, in combination with the tongue A and hounds, all constructed as and for the purpose described.

2. The cap E, provided with lug b, wings c, lips f, and the horizontal flange g, in combination with the double-tree F, provided with the bent plate i, and the plate h, all constructed to operate substantially as and for the purpose set forth and described.

JOHN I. NISSEN.
CHRISTIAN F. NISSEN.

Witnesses as to Jno. I. Nissen:
 N. S. COOK,
 WM. BARROW.

Witnesses as to C. F. Nissen:
 C. A. FOGLE,
 J. H. MARTIN.